United States Patent [19]

Kindorf

[11] 4,078,752

[45] Mar. 14, 1978

[54] CONDUIT SUPPORT AND SEISMIC BRACING SYSTEM

[75] Inventor: David O. Kindorf, Lafayette, Calif.

[73] Assignee: Kin-Line, Inc., Emeryville, Calif.

[21] Appl. No.: 761,314

[22] Filed: Jan. 21, 1977

[51] Int. Cl.$^2$ ............................................. F16E 3/10
[52] U.S. Cl. ...................................... 248/62; 248/59; 248/70; 248/68 R; 248/354 R
[58] Field of Search ...................... 248/49, 58, 59, 62, 248/351, 70, 354 R, 317, 323, 327, 54 R, 54 CS, 354 C, 354 L, 354 P, 354 S, 68 R, 72; 52/167, 152; 138/107

[56] References Cited

U.S. PATENT DOCUMENTS

| 883,138 | 3/1908 | Kirchhoff | 248/70 |
| 1,466,292 | 8/1923 | Bell | 248/58 |
| 2,335,833 | 11/1943 | Wood | 248/54 R |
| 2,638,188 | 5/1953 | Corn | 248/354 P X |
| 2,869,936 | 1/1959 | Federn | 248/54 R X |
| 3,436,047 | 4/1969 | Foltz | 248/62 X |
| 3,528,634 | 9/1970 | Jenkins | 248/327 X |
| 3,547,385 | 12/1970 | Kindorf | 248/62 |
| 3,556,447 | 1/1971 | Jenkins | 248/62 |
| 3,570,794 | 3/1971 | Kirschner | 248/62 X |

FOREIGN PATENT DOCUMENTS 418,671  5/1974  U.S.S.R. ........................... 248/54 R

Primary Examiner—Roy D. Frazier
Assistant Examiner—Rodney H. Bonck
Attorney, Agent, or Firm—Fitch, Even, Tabin & Luedeka

[57] ABSTRACT

A support and seismic bracing system for suspending conduit and the like includes support means for carrying the weight of the conduit, relative movement of the conduit being limited by a seismic anchor secured to the conduit and to a structural surface in offset relation about equidistant along the axis of the conduit, radially outwardly from the conduit and vertically toward the structural surface, a seismic brace being interconnected between the supported conduit and the anchor to resist relative movement in any direction of the conduit, the seismic brace preferably extending linearly toward the center of mass for the suspended conduit and effectively acting as a fixed-end rigid column connection.

9 Claims, 4 Drawing Figures

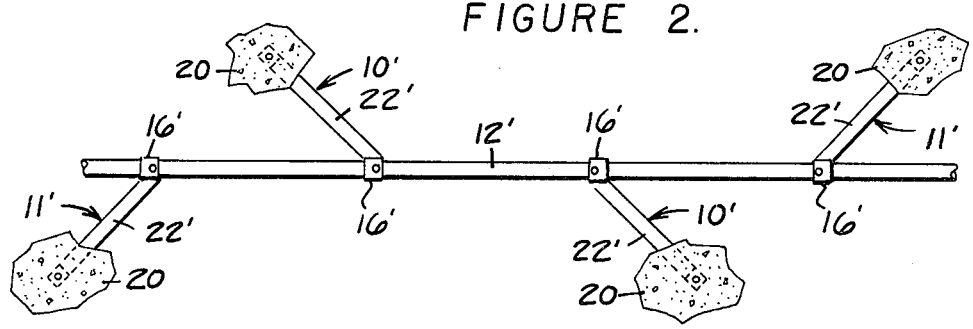
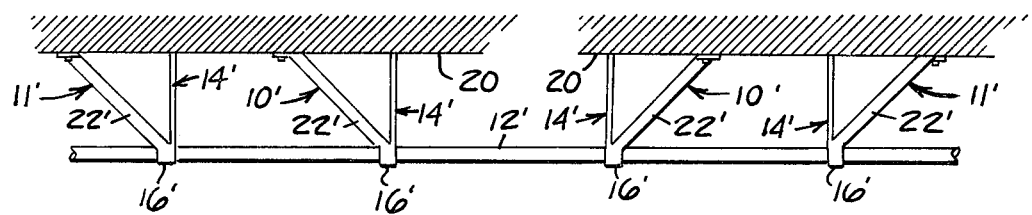
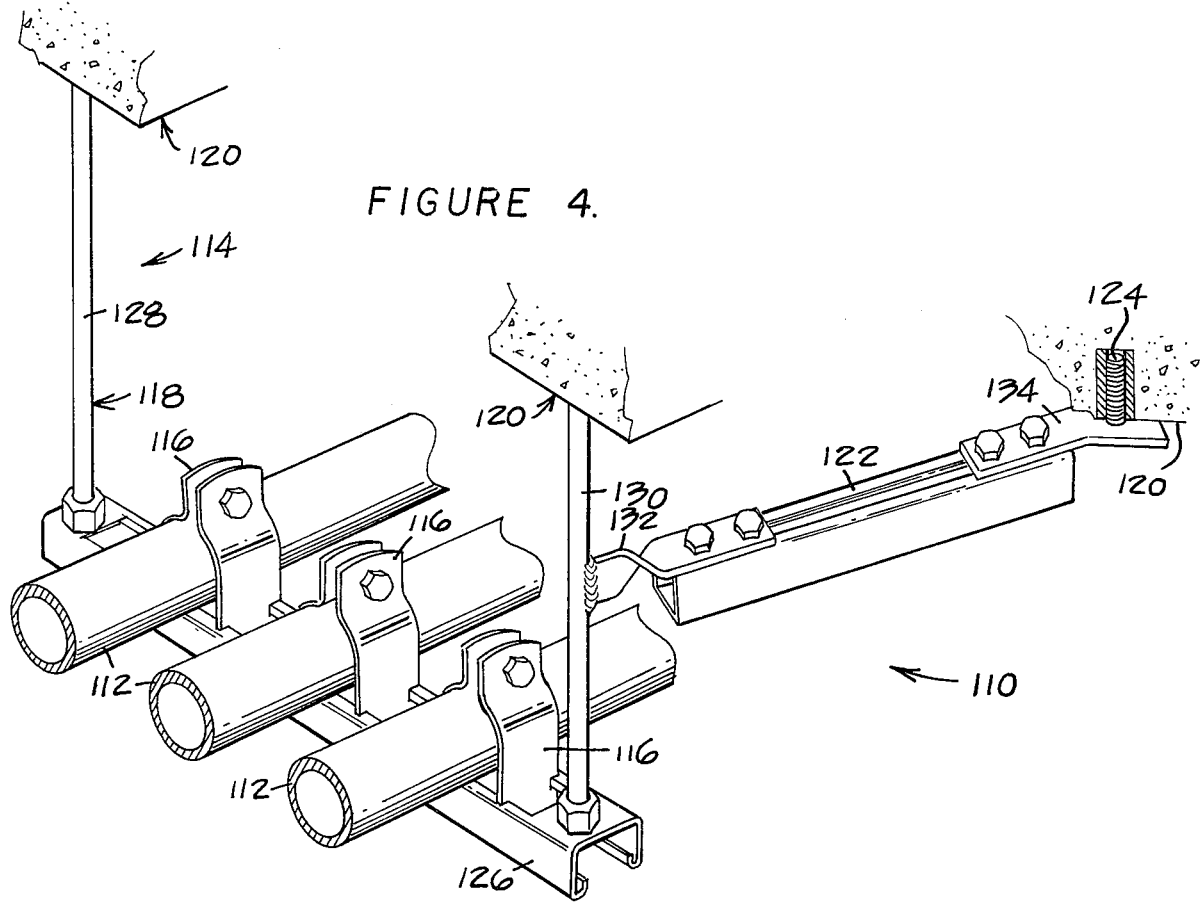

CONDUIT SUPPORT AND SEISMIC BRACING SYSTEM

BACKGROUND OF THE INVENTION

The present invention relates to a support system for conduit and the like and more particularly to seismic bracing employed for effectively resisting relative movement in any direction between the conduit and a structural surface or element.

Various support or hanger systems are commonly employed for mounting pipe, conduit, light fixtures and other types of similar equipment and other structures with spaced apart portions of the conduits being supported from anchors or channels secured to a structural surface such as a ceiling or wall of a building. The support or hangers may engage single conduits or they may be adapted in the manner of so called "trapeze" hangers to provide support for a number of parallel conduits.

Regardless of the specific type of hanger system and conduit arrangement, it is becoming increasingly important to anchor the conduits in order to prevent relative movement between the conduit and the structure from which it is suspended. Generally, supports or hangers of the type referred to above extend vertically between the conduit and a structural surface in order to carry the weight of the conduit. However, in the event of external forces such as seismic conditions, the conduits may tend to experience relative movement, for example either laterally or axially in relation to its axis.

Various code requirements for buildings and the like, at least in certain geographical areas require that such relative movement be limited or constrained in order to prevent rupture or discontinuity within the conduits.

The limiting of relative movement between conduits and structural support is known in the prior art and generally comprises the use of braces for interconnecting the suspended conduit with an anchor point which is in turn secured to the support structure for the conduit. However, a number of problems have been observed in connection with such seismic bracing systems employed in the prior art. Initially, the systems commonly include braces which extend radially outwardly and vertically upwardly from the axis of the conduit toward an anchor point. Braces of this type thus extend perpendicularly from the conduit and permit the use of relatively simple brackets for interconnection. However, the use of such braces tends to limit movement of the conduit only in one or two directions. For example, a brace of the type referred to immediately above tends to limit both vertical and lateral movement of the conduit relative to its axis. However, such a brace does not effectively limit or restrain relative movement of the conduit along its axis.

Further, if such a seismic bracing system is to be effective, it is necessary to resist very substantial bending forces tending to act upon the braces because of the relative movement between the anchor point and the conduit. Prior art bracing systems have not been found to adequately anticipate or to make provision for overcoming the effects of such bending forces.

Accordingly, there has been found to remain a need for an effective seismic bracing system where relative movement in any direction between the suspended conduit and a structural surface or element is effectively limited or restrained.

SUMMARY OF THE INVENTION

Accordingly, it is an object of the invention to provide seismic bracing for conduit and the like wherein relative movement in any direction between the conduit and a structural support surface is effectively limited by a seismic bracing system of relatively simple construction.

It is a similar object of the invention to provide such a seismic bracing system as an improvement in connection with generally conventional support means.

It is another object of the invention to provide such a seismic bracing system wherein seismic braces are rigidly interconnected between the supported conduit and an anchor point in order to effectively form a fixed-end column connection between the conduit and the seismic anchor and to thereby better resist bending forces acting on the braces and provide greater resistance to relative movement in any direction between the conduit and the anchor.

It is also a further object of the invention to provide such a seismic bracing system wherein the seismic braces interconnected between the conduit and a seismic anchor have a load axis extending between the center of mass for the conduit and a central portion of the seismic anchor in order to further minimize bending forces acting thereupon.

It is yet another object of the invention to provide a plurality of such seismic bracing systems for respectively supporting and bracing spaced apart portions of a single or composite conduit.

It is yet another related object of the invention to provide such a plurality of seismic bracing systems wherein the respective systems are arranged to act in opposition to each other in order to better limit movement in any direction of the conduit.

Additional objects and advantages of the invention are made apparent in the following description having reference to the accompanying drawings.

BRIEF DESCRIPTION OF THE DRAWINGS

FIG. 2 is a schematic plan view of a supported conduit which is restrained at various points along its length by a plurality of such seismic bracing systems.

FIG. 3 is a side view in schematic form of the conduit of FIG. 2.

FIG. 4 is a perspective view of another embodiment of the invention wherein similar seismic bracing is employed for a plurality of conduits which are braced as a unit.

DESCRIPTION OF THE PREFERRED EMBODIMENTS

Figure 1:
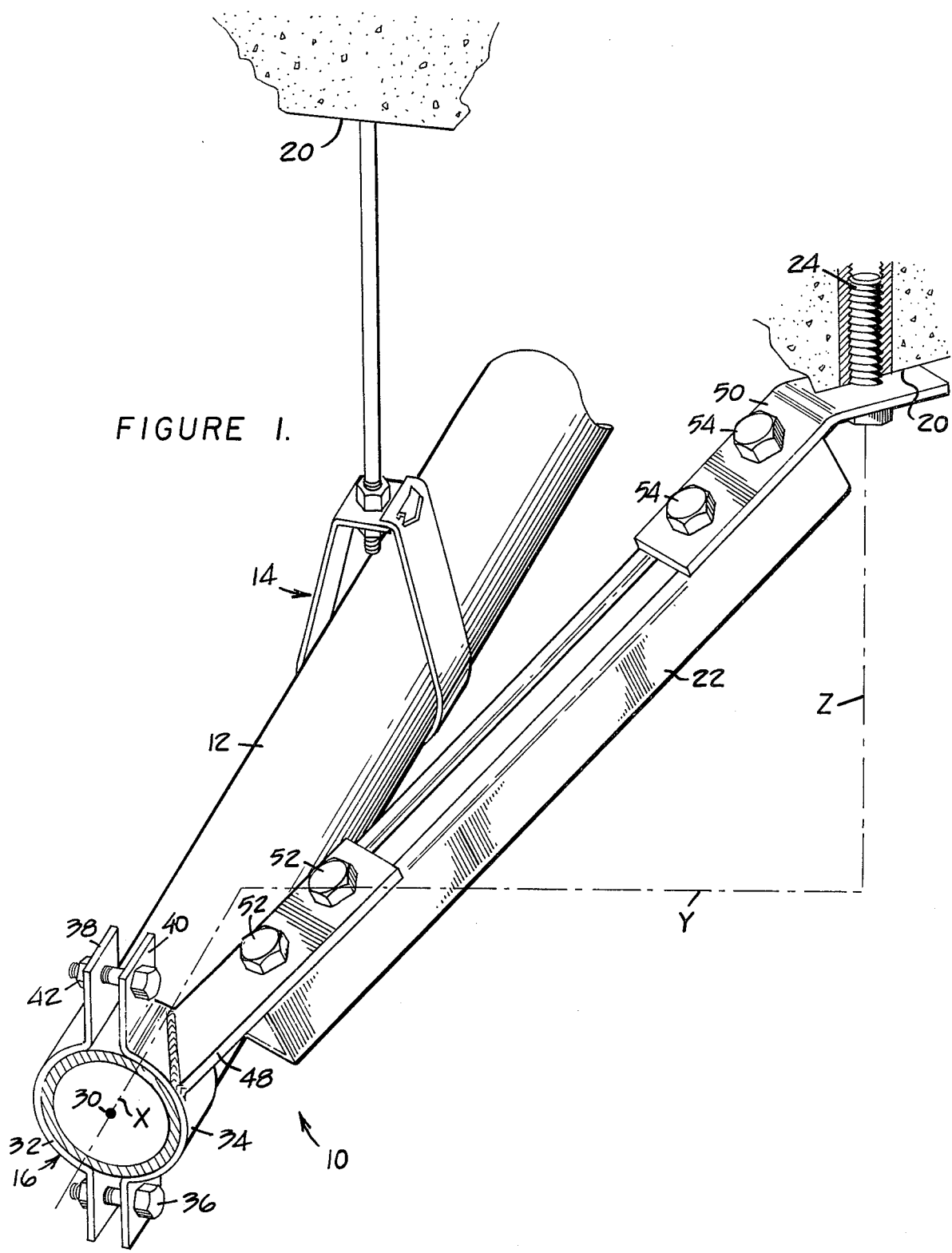
FIG. 1 is a perspective view of a seismic bracing system according to the present invention for securing a single point along the length of a supported conduit.

Different embodiments of the present invention are illustrated in the drawings. Each embodiment includes a seismic bracing system with clamp means being secured to the conduit or pipe. A seismic brace is interconnected between the clamp means for the conduit and a seismic anchor located about equidistant along the axis of the conduit, radially outwardly from the conduit and vertically upwardly toward a structural surface or ceiling so that the seismic brace resists movement in effectively any direction of the conduit relative to the structural surface. If the seismic brace is secured to a structural side wall for example, the anchor may be located vertically upwardly or downwardly from the clamp means.

In FIG. 1, a seismic bracing system according to the present invention is generally indicated at 10 for bracing a supported conduit 12. The conduit is supported along its length by conventional hanger supports such as that indicated at 14. One or more of the hanger supports serve to suspend the conduit from a structural surface 20 such as a ceiling in a building. However, it will be obvious from the following description that the support means may be combined with the seismic bracing system as is made apparent in the embodiment of FIGS. 2-4. In addition, because of the rigid interconnections for the seismic bracing and its vertical spacing, the support of the conduit may be accomplished by one or more seismic braces of the present invention without separate support.

The bracing system 10 includes clamp means 16 for surrounding and clasping the conduit. A seismic brace 22 is interconnected between the clamp means 16 and a seismic anchor 24 to resist movement in any direction between the conduit and the structural surface 20. To accomplish this function, the anchor 24 is also secured to the same structural surface 20 as the hanger 14, the anchor 24 being offset from the clamp means 16 in the manner described above.

FIG. 2 illustrates a combination of support and seismic bracing systems which are each similar to the system illustrated in FIG. 1. The various support and bracing systems in FIGS. 2 and 3 are arranged in opposition to each other and support spaced apart portions of the conduit in order to better resist relative movement between the conduit and the structural surface 20.

Another embodiment of a support and seismic bracing system is illustrated at 110 in FIG. 4 for supporting and bracing a composite arrangement of conduits or pipes 112. Composite support is provided for the conduits 112 by separate clamp means 116 which respectively engage the conduits 112. The clamp means 116 are all secured to a "trapeze" type hanger 114 for supporting the conduits 112 relative to a structural surface 120. The trapeze hanger 114 is similarly interconnected with a seismic anchor 124 by means of a seismic brace 122. The seismic brace 122 extends generally between a center of mass for the composite conduits 112 and a central portion of the seismic anchor 124. The seismic anchor 124 is also similarly offset about equidistant along the axis of the multiple conduits 112, radially outwardly therefrom and vertically toward the structural surface 120.

In FIGS. 2 and 3, seismic bracing systems 10' are each similar to that indicated at 10 in FIG. 1 except that vertical support is provided by a hanger support 14' associated with each seismic brace. In addition, the conduit 12' of FIG. 2 is also supported by additional bracing systems indicated respectively at 11. The bracing systems 11 of FIG. 2 vary only from those indicated at 10' in that they are mirror images thereof so that the bracing systems 10' and 11 may be arranged in opposition to each other in order to better limit relative movement of the conduit 12' relative to the structural surface 20'. It may be seen from FIGS. 2 and 3 that the bracing systems are arranged in opposition along the axis of the conduit. Similar opposition may also be provided vertically in order to further rigidize the bracing for the conduit or conduits.

Joint reference to FIGS. 2 and 3 also better illustrates the angular arrangement of the seismic braces 22' and the relative location of the seismic anchors 24' relative to the clamps 16' which engage the conduit 12'. In the plan view of FIG. 2, it may be seen that the various anchors 24' for the bracing systems 10' and 11 are offset both axially and radially relative to the conduit 12'. Reference to FIG. 3 illustrates that the anchors 24' are also offset vertically from the axis of the conduit 12'. As was indicated above, the offset distances in each of these three directions for the anchors 24' are generally equal so that the braces 22' are effective to equally resist movement of the conduit in any direction.

To describe the support and bracing systems 10 of FIG. 1 in greater detail, the conduit 12 has a center of mass generally indicated at 30. The clamp means 16 includes two shaped straps 32 and 34 which are joined together beneath the conduit 12 by a bolt 36. The straps 32 and 34 pass upwardly on opposite sides of the conduit 12 with their upper ends 38 and 40 being urged together by a bolt 42 so that the conduit 12 is firmly secured between the straps 32 and 34.

As was noted above, the seismic anchor 24 is offset from the center of mass 30 for the conduit 12 generally equidistant along the axis of the conduit 12, radially outwardly therefrom and vertically toward the structural support surface 20. These equidistant offsetting segments are indicated respectively at X, Y and Z. The anchor 24 is preferably a simple anchor bolt which is securely attached to the surface 20.

The seismic brace 22 is generally rigid along its length while being interconnected between the strap 34 of the clamp 16 and the anchor 24 by means of respective brackets 48 and 50. The bracket 48 is rigidly connected to the bracket 34, for example by welding. The other bracket 50 is also rigidly secured by the seismic anchor 24 while the seismic brace 22 is rigidly interconnected with the brackets 48 and 50. Thus, the seismic brace forms a fixed-end, rigid column connection between the support conduit and the seismic anchor.

The rigid brace 22 is preferably formed as a U-shaped channel which is flanged along its open edges. The brackets 48 and 50 may then simply be secured rigidly to the channel brace 22 by pairs of bolts 52 and 54 which permit limited adjustment in the overall length of the brace 22 and brackets 48 and 50 to further facilitate installation while maintaining the rigid coupling between the clamp 16 and anchor 24.

The offsetting segments X, Y and Z need not be actually equal according to the present invention. For example, the various segments may vary as much as a ratio of 2 to 1 while still providing a restraining effect on the conduit in three directions. However, the angles of attachment for the brackets 48 and 50 tend to become more complex when the segments are of substantially different lengths. Thus, the offsetting segments X, Y and Z are preferably maintained about equal in length in order to facilitate construction and installation of the seismic bracing systems.

In addition, the seismic brace 22 and the brackets 48 and 50 are arranged and interconnected to have an effective load axis, generally indicated at 56, which extends between the center of mass 30 for the conduit and the anchor 24. In this manner, bending forces acting upon the seismic brace are minimized so that the bracing system is more effective to resist relative movement of the conduit 12.

The ability of each seismic brace 22 to resist relative movement of the conduit 12 is further enhanced by its rigid column interconnection since the bending moment of the brace is effectively reduced to the central fifty percent of the length of each of the braces 22. This proportion is based upon a comparison with a brace assumed to be interconnected with both the clamping strap 34 and the anchor 24 by pivot connections which would permit the entire length of the seismic brace between those connections to experience a bending moment or effect.

The embodiment of FIG. 4 is adapted to provide the same advantages in a system for supporting and bracing a plurality of conduits 112. The hanger 118 includes a channel member 126 to which each of the clamps 116 is secured. The channel member 126 is in turn suspended by a pair of hanger posts 128 and 130 which engage opposite ends of the channel member 126 at their lower ends while extending upwardly for connection with the structural support surface 120.

The seismic brace 122 similarly has brackets 132 and 134 rigidly connected at opposite ends thereof. The bracket 134 is rigidly secured by the seismic anchor 124 to accomplish the same function as the bracket 50 in FIG. 1. The other bracket 132 is rigidly interconnected between the seismic brace 122 and one of the hanger posts 130. In this manner, the seismic brace 122 again effectively forms a fixed-end, rigid column connection between the composite conduits 112 and the anchor 124. The same effect could be accomplished if the bracket 132 were secured for example to the clamp 116 for the centrally arranged conduit 112. In addition, the seismic brace 122 of FIG. 4 has a load axis extending generally linearly between the center of mass for the composite conduits 112 and the anchor 124. Within the embodiment of FIG. 4, the center of mass for the composite conduit 112 may be taken as the axial center of the middle conduit.

Additional modifications and variations of the support and bracing system described above are possible within the scope of the present invention. Accordingly, the scope of the present invention is defined only by the following appended claims.

What is claimed is:

1. A seismic bracing system for a conduit having hanger means separate from said bracing system for suspending the conduit relative to a structural surface and substantially carrying the weight of the conduit, the seismic bracing system bracing the conduit against movement due, for example, to seismic effects, comprising clamp means for surrounding and clasping the conduit, a seismic anchor secured to the structural surface, the location of the anchor being segmentally offset from the clamp means in three directions along the axis of the conduit, radially outwardly from the conduit and vertically toward the structural surface, and a seismic brace interconnected linearly between the clamp means and the anchor to resist relative movement in any direction between the conduit and the structural surface, the seismic brace being effectively rigid along its length and further comprising bracket means for rigidly interconnecting the seismic brace with the clamp means and the seismic anchor respectively whereby the seismic brace forms a fixed-end rigid column connection between the clamp means and the seismic anchor, the seismic brace having a load axis along its length, the seismic brace and interconnected brackets being arranged so that the load axis extends substantially linearly between a center of mass for the conduit and the seismic anchor.

2. The seismic bracing system of claim 1 comprising sets of clamp means, seismic anchors and seismic braces for respectively supporting and bracing spaced apart portions along the length of the conduit.

3. The seismic bracing system of claim 2 wherein the respective sets of clamp means, seismic anchors and seismic braces are arranged to act in opposition to each other in order to better limit movement in any direction of the conduit.

4. A seismic bracing system for a conduit having hanger means separate from said bracing system for suspending the conduit relative to a structural surface and substantially carrying the weight of the conduit, the seismic bracing system bracing the conduit against movement due, for example, to seismic effects, comprising a seismic anchor secured to the structural surface, the location of the anchor being segmentally offset in three directions along the axis of the conduit, radially outwardly from the conduit and vertically toward the structural surface, and a seismic brace interconnected linearly between the conduit and the anchor to resist relative movement in any direction between the conduit and the structural surface, the seismic brace being effectively rigid along its length and further comprising bracket means for rigidly connecting the seismic brace with the conduit and the seismic anchor respectively whereby the seismic brace forms a fixed-end rigid column connection between the conduit and the seismic anchor, the seismic brace being a channel member adapted for adjustable engagement by the bracket means to facilitate interconnection of the seismic brace between the conduit and the seismic anchor.

5. The improved support and seismic bracing system of claim 4 wherein the seismic brace has a load axis along its length, the seismic brace and interconnected brackets being arranged so that the load axis extends linearly between a center of mass for the conduit and the seismic anchor.

6. The improved bracing system of claim 4 adapted to support and brace a plurality of conduits, the seismic brace being effectively interconnected with the plurality of conduits and arranged to have a load axis extending linearly between a center of mass for the composite conduits and the seismic anchor.

7. The improved bracing system of claim 4 comprising sets of the clamp means, seismic anchors and seismic braces for respectively supporting and bracing spaced apart portions along the length of the conduit.

8. The improved bracing system of claim 4 wherein the respective sets of seismic anchors and seismic braces are arranged to act in opposition to each other in order to better limit movement in any direction of the conduit.

9. The improved bracing system of claim 4 wherein the offset segments between the seismic anchor and conduit are approximately equidistant.

* * * * *